Dec. 9, 1952          H. R. GREGORY          2,620,789
HEAT EXCHANGER FOR REHEATING OF PRECOOKED FOODS
Filed June 10, 1948
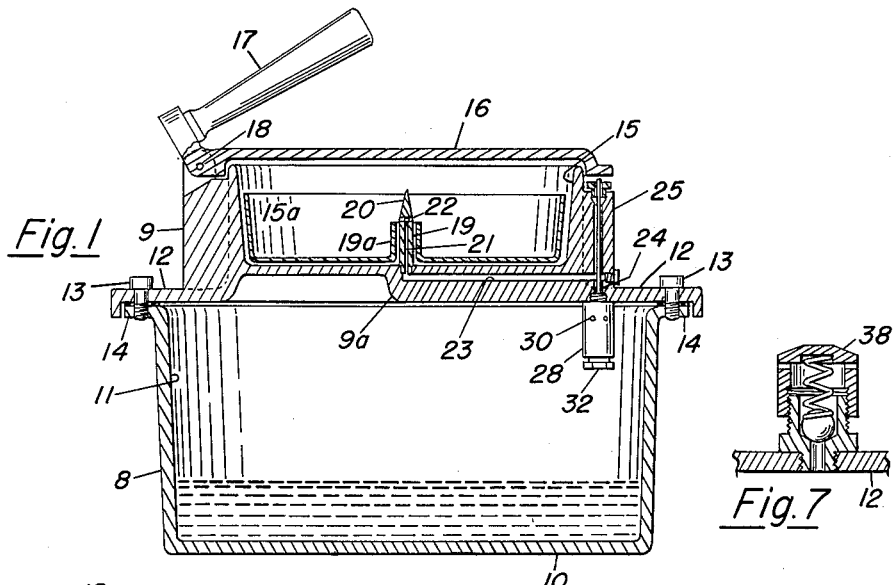
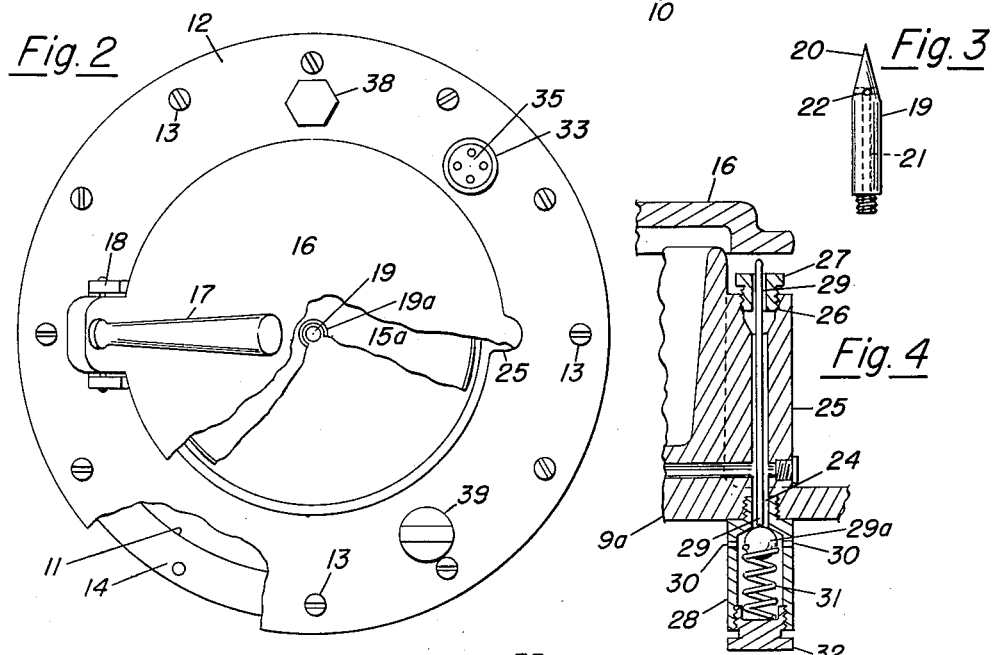
INVENTOR.
HARRY R. GREGORY
BY *Everett N. Curtis*
ATTORNEY Patented Dec. 9, 1952

2,620,789

UNITED STATES PATENT OFFICE 2,620,789

HEAT EXCHANGER FOR REHEATING OF PRECOOKED FOODS

Harry R. Gregory, San Diego, Calif., assignor of one-half to Sylvester Boyles, San Diego, Calif.

Application June 10, 1948, Serial No. 32,172

2 Claims. (Cl. 126—379)

My invention relates to heat exchangers, particularly as employed for reheating from the inside thereof pre-cooked foods ready to serve cafe or restaurant customers, or otherwise as employed as a convenient means for immunizing various objects or articles requiring sterilization; and its objects are:

To provide a single heating vessel for separately producing and holding steam or other hot gases and for transmitting the same to an upper chamber thereof primarily for the heating of pre-cooked food confined therein; to provide a heating vessel of this character which is portable and of convenient size to be placed upon a stove or other conventional heating means and to be heated therefrom; to provide a lidded upper and closed lower chambered heating vessel, in which the lower chamber is employed for the production of steam or other hot gases to be held until needed, and the upper chamber is used for reheating sandwiches, pies, pre-cooked meat, poultry, fish and other food from heat furnished by said gases transmitted directly within the mass of said foods from the chamber below; to furnish means for automatically indicating the limit of pressure in the said lower chamber when the temperature therein exceeds about 260 degrees Fahrenheit, and of providing a pop-off safety valve for the release of said pressure shortly after said pressure limit is reached; to furnish an improved heating apparatus employing steam or other hot gases for use in sterilizing surgical instruments and supplies, bandages, babies' garments, clothing, dishes, bottles, jars and other articles; to render the parts readily accessible for inspection, adjustment, replacement or repair, and generally to provide a heating apparatus which is economical of construction, efficient in action and of prolonged life and durability.

My invention further consists of other novel features of construction, and combinations and arrangements of parts, illustrated in the drawing and hereinafter more particularly described and claimed.

Attention is hereby directed to the accompanying drawing illustrating a preferred form of my invention, in which similar numerals of designation refer to similar parts throughout the several views, and in which:

Figure 1 is a vertical section of the apparatus, showing the lower and upper chambers, passageways communicating therewith, hinged lid and handle, and adjacent parts;

Fig. 2 is a plan view of the apparatus shown in Fig. 1, certain parts being broken away for the purpose of better illustration;

Fig. 3 is a side elevation of the upright spindle jet;

Fig. 4 is an enlargement of the right hand portion of the section shown in Fig. 1, adjacent to the steam valve inlet, showing in detail the construction of the parts thereof;

Fig. 5 is a plan view of the indicator valve;

Fig. 6 is a section of the indicator valve on line 6—6 of Fig. 5, looking in the direction of the arrows, and Fig. 7 is a vertical section of the pop-off safety valve.

Referring to the drawing, the heat exchanger there shown comprises lower and upper members 8 and 9; the lower member 8 being in the form of a cylindrical pot with a flat bottom 10 and compartment 11, and the upper member 9 being in the form of a turret-shaped receptacle having the annular flange 12 at the base thereof secured by bolts 13 to the registering flange 14 forming the rim of lower member 8. Preferably, the hollow 15 of upper member 9 is made in the form of a deep dish, and to the top of one portion of the wall of said member 9 is hinged the lid 16 forming the cover thereof; an angularly disposed handle 17 being firmly secured to said lid adjacent to its hinge 18 and serving to open and shut the same.

In threaded engagement with, and extending upwardly from, the center of the bottom of member 9 within the hollow 15 is the hollow spindle forming the jet 19, having the cone-shaped pointed end 20, passageway 21 and discharge ducts 22 opening outwardly therefrom; the said pointed end being sufficiently sharp readily to penetrate a mass of food impressed downwardly thereon and to allow the said food to be heated solely from the inside thereof by the steam or heated gas coming through the said ducts from below as will more particularly hereinafter and at large appear. If desired, a pan 15a, provided with the upright riser 19a enclosing the said jet below ducts 22, may be installed within the hollow 15. As shown, the bottom of said member 9 has formed therein the thickened portion 9a, in which is made the longitudinally extending channel 23 and upright inlet portal 24 leading therein from connecting passageways connected with the compartment 11 below; the said channel 23 communicating with the lower end of passageway 21 of the jet 19 and serving to conduct gases coming from said compartment through said inlet to the jet 19 to be dispensed therefrom as hereinafter set forth.

Integral with the wall of the upper chamber 9 and with thickened portion 9a, is the upright tubular extension 25, with its hollow 26 enlarged at its top for threaded engagement with the apertured cap 27, and in threaded engagement with its bottom, the barrel-shaped casing 28, having an outlet aligned with and forming part of the inlet portal 24, and having the inlet ports 30 leading from the compartment 11. Mounted to reciprocate vertically within the said openings of the extension 25 is the valve stem 29, the upper end of which protrudes above the cap 27, and to the bottom of which within the casing 28 is secured the ball 29a; the said ball engaging with the expansion spring 31 filling the bore of the barrel of the said casing and maintained in position by the cap 32 in threaded engagement with the base of said barrel, thereby imparting an upward thrust to the valve stem 29 and holding the same in yielding spring engagement with the lid 16 when pressed downwardly upon the upper end of said stem. As shown, the inlet portal 24 is made of greater diameter than that of said valve stem in order to secure sufficient clearance from said stem for the ready flow of the gases admitted through the ports 30 and passing into and through the channel 23.

For the purpose of indicating the limit of temperature to be maintained in the compartment 11, I provide the indicator valve mechanism, shown more particularly in Figs. 5 and 6, comprising the cylindrical weighted cap 33, hollow stem 34 in threaded engagement with the threaded opening 34a in flange 12 of the upper member with continuous passageway therethrough into compartment 11, and perforated cover 35 from which downwardly protrudes the valve 36; the hollow of said valve stem being chamfered at the top to form the valve seat 37, and normally close said valve through the weight of the cap 33, but allowing said valve to float with small release of steam or gas when the pressure of the same in the compartment reaches about 15 pounds to the square inch at a temperature of about 260 degrees Fahrenheit, so long as such levels are maintained. To guard, however, against the possibility of such pressure unduly exceeding such desired limits, I provide the conventional safety pop-off valve 38 shown in Fig. 7, which is also mounted upon said flange 12 and communicates with compartment 11, and which is set to unload when the pressure therein exceeds 22 pounds to the square inch.

For the admission of water or other fluids into the compartment 11 of the lower member 8, I preferably provide an inlet through the flange 12, normally closed by the conventional stopper 39; which inlet and stopper may be of any form or construction suitable for the purpose.

When using the apparatus above described for reheating pre-cooked foods, I remove the stopper 39, and through the inlet opened thereby, I partially fill the compartment with water or other liquid to be vaporized by heat. Then, upon the replacement of said stopper, the apparatus is placed upon a stove or exposed to other conventional sources of heat, and the liquid is heated and brought to the boiling point, with release of steam or vapor. When the pressure of such gas is such as to cause the indicator valve 36 to float as hereinbefore set forth, the apparatus is ready for use. While such heat is maintained, a food such as pre-cooked meat, poultry or fish is placed in the pan 15a, and the lid 16 is firmly closed down upon the protruding upper end of the valve stem 29, causing the downward movement of the same and the depression of the ball 29a against the spring 31, and consequently the opening of the inlet portal 24. Whereupon, the steam or gas generated in compartment 11 passes upwardly therefrom, through connecting passageways above referred to, and is discharged through the ducts 22 of the jet 19 into the pan 15a and hollow 15 of member 9, where the said food is reheated to the temperature desired for serving the customer. If, through such reheating, any juices are released, they remain in the bottom of the pan and may be removed therefrom without soiling the bottom or dished walls of the member 9. Such pan, however, may be removed at any time for the reheating of other foods such as sandwiches or pies or other pre-cooked food introduced into said hollow unwrapped or in paper bags or other containers, the point of the jet 19 passing into the mass thereof and supplying heated vapor within the same to the extent desired.

My invention may be embodied in other specific forms without departing from the spirit or essential characteristics thereof. The present embodiment, as above set forth, is therefore to be considered in all respects as illustrative and not restrictive, the scope of my invention being indicated by the appended claims rather than by the above description, and all changes which come within the meaning and range of equivalency of the claims are therefore intended to be embraced therein.

What I claim and desire to secure by Letters Patent is:

1. In manually operated heat exchangers for re-heating of pre-cooked foods, the combination of a metallic pot for the production of steam from water contained therein upon heat being applied thereto; a metallic receptacle mounted upon and closing said pot and having extending upwardly from the bottom thereof a food piercing pointed jet with discharge ducts connected with a passageway for said steam formed in said bottom and having an inlet communicating with the interior of said pot and said ducts and passageway being positioned and adapted for the admission of and for the reheating by said steam from within of pre-cooked foods introduced in said receptacle and pierced by said jet; a lid hingedly connected with said receptacle; manually operated means secured to said lid adjacent to the hinge thereof and serving to open and close said receptacle; and valve means operable by said lid and adapted upon the opening or closing thereof to control the admission of steam through said passageway into said receptacle.

2. In manually operated heat exchangers for re-heating of pre-cooked foods, the combination of a metallic pot for the production of steam from water contained therein upon heat being applied thereto; a round metallic receptacle mounted upon and closing said pot and having extending upwardly from the bottom and equidistant from the sides thereof, a food piercing pointed jet with discharge ducts laterally opening therefrom and connected with a passageway for said steam formed in said bottom and having an inlet communicating with the interior of said pot and said ducts and passageway being positioned and adapted for the admission of and for the reheating by said steam from within of pre-cooked foods introduced in said receptacle and pierced by said jet; a lid hingedly connected with said receptacle; an angularly disposed handle secured to said lid adjacent to the hinge thereof and serving to open and close said receptacle; valve means operable by said lid and adapted upon the opening or closing thereof to control the admission of steam through said passageway into said receptacle; and means for indicating and limiting the pressure of said steam while said pre-cooked foods are being re-heated.

HARRY R. GREGORY.

REFERENCES CITED

The following references are of record in the file of this patent:

UNITED STATES PATENTS

| Number | Name | Date |
|---|---|---|
| Re. 17,336 | McKenna | June 25, 1929 |
| 96,509 | Totten | Nov. 2, 1869 |
| 115,333 | Meyer | May 30, 1871 |
| 165,483 | DeMoss | July 13, 1875 |
| 186,067 | Thompson | Jan. 9, 1877 |
| 332,283 | Parker | Dec. 15, 1885 |
| 372,044 | Rose et al. | Oct. 25, 1887 |
| 612,406 | Davis | Oct. 18, 1898 |
| 712,760 | Breun et al. | Nov. 4, 1902 |
| 783,506 | Cooke | Feb. 28, 1905 |
| 1,318,790 | Murray | Oct. 14, 1919 |
| 1,371,520 | Schafer | Mar. 15, 1921 |
| 1,399,094 | Watts | Dec. 6, 1921 |
| 1,958,590 | Peirce | May 15, 1934 |
| 2,452,790 | Pledger | Nov. 2, 1948 |

FOREIGN PATENTS

| Number | Country | Date |
|---|---|---|
| 509,345 | Great Britain | July 14, 1939 |